United States Patent
Xu et al.

(10) Patent No.: US 9,964,403 B2
(45) Date of Patent: May 8, 2018

(54) DEVICE AND METHOD FOR DETECTING FLATNESS OF SURFACE OF DISPLAY PANEL

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Dezhi Xu, Beijing (CN); Xianxue Duan, Beijing (CN); Cheng Chen, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 96 days.

(21) Appl. No.: 14/912,951

(22) PCT Filed: Aug. 18, 2015

(86) PCT No.: PCT/CN2015/087336
§ 371 (c)(1),
(2) Date: Feb. 19, 2016

(87) PCT Pub. No.: WO2016/138744
PCT Pub. Date: Sep. 9, 2016

(65) Prior Publication Data
US 2016/0377422 A1    Dec. 29, 2016

(30) Foreign Application Priority Data

Mar. 2, 2015 (CN) .......................... 2015 1 0093122

(51) Int. Cl.
*G01B 11/30* (2006.01)
*G02F 1/1333* (2006.01)
(Continued)

(52) U.S. Cl.
CPC .......... *G01B 11/30* (2013.01); *G02F 1/13338* (2013.01); *G06F 3/0412* (2013.01);
(Continued)

(58) Field of Classification Search
CPC ... G01B 11/30; G02F 1/13338; G02F 1/1309; G06F 3/0412; G06F 2203/04103;
(Continued)

(56) References Cited

U.S. PATENT DOCUMENTS 5,504,303 A * 4/1996 Nagy ................. B23K 26/0075
219/121.68
6,449,048 B1 * 9/2002 Olszak ............... G01B 11/2441
356/497
(Continued)

FOREIGN PATENT DOCUMENTS

CN    2814333 Y    9/2006
CN    101206380 A    6/2008
(Continued)

OTHER PUBLICATIONS

International Search Report dated Nov. 27, 2015 corresponding to International application No. PCT/CN2015/087336.
(Continued)

*Primary Examiner* — Joseph L Williams
*Assistant Examiner* — Jose M Diaz
(74) *Attorney, Agent, or Firm* — Nath, Goldberg & Meyer; Joshua B. Goldberg

(57) ABSTRACT

Provided are a device and a method for detecting flatness of a surface of a display panel. The device comprises: a bearing platform for bearing a display panel; an image acquisition
(Continued)

unit that moves in a detection plane parallel to a bearing surface of the bearing platform and is used for focusing detection points preset in a surface of the display panel facing the image acquisition unit in a direction perpendicular to the bearing surface of the bearing platform, and sending a focal length to a data processing unit; and a data processing unit used for calculating a distance of each of the detection points from the detection plane according to the focal length, and then determining the flatness of the surface of the display panel. The damage and pollution to the display panel may be avoided according to the device and method of the present invention.

17 Claims, 3 Drawing Sheets

(51) Int. Cl.
    *G06F 3/041*      (2006.01)
    *G06T 7/00*       (2017.01)
    *G02F 1/13*       (2006.01)

(52) U.S. Cl.
    CPC .......... *G06T 7/0006* (2013.01); *G02F 1/1309* (2013.01); *G06F 2203/04103* (2013.01); *G06T 2207/10148* (2013.01); *G06T 2207/30108* (2013.01); *G06T 2207/30121* (2013.01)

(58) Field of Classification Search
    CPC ......... G06T 7/0006; G06T 2207/30121; G06T 2207/10148; G06T 2207/30108; H01J 9/42; H01J 9/44; H01K 1/60; H01K 3/305; H01L 51/0031; H01L 21/06
    See application file for complete search history.

(56) References Cited

U.S. PATENT DOCUMENTS

| | | | | |
|---|---|---|---|---|
| 9,164,405 | B2* | 10/2015 | Sasaki | G01B 11/2441 |
| 9,644,954 | B2* | 5/2017 | Girard | G01B 11/30 |
| 2003/0090669 | A1* | 5/2003 | Jung | G01B 11/0675 |
| | | | | 356/450 |
| 2005/0157306 | A1* | 7/2005 | Schmit | G01B 11/161 |
| | | | | 356/495 |
| 2011/0188731 | A1* | 8/2011 | Sekiguchi | G01B 11/30 |
| | | | | 382/141 |
| 2012/0243004 | A1* | 9/2012 | El Gawhary | G01B 11/24 |
| | | | | 356/601 |
| 2013/0033595 | A1* | 2/2013 | Adelson | A61B 5/0077 |
| | | | | 348/92 |
| 2014/0118558 | A1* | 5/2014 | Imoto | G09G 3/006 |
| | | | | 348/181 |
| 2014/0291514 | A1* | 10/2014 | Gong | G01N 21/88 |
| | | | | 250/310 |
| 2014/0301640 | A1* | 10/2014 | Hirano | G06T 7/0002 |
| | | | | 382/165 |
| 2014/0375988 | A1* | 12/2014 | Ito | G01B 11/303 |
| | | | | 356/237.5 |
| 2016/0131593 | A1* | 5/2016 | Kwon | G01B 11/2518 |
| | | | | 438/7 |

FOREIGN PATENT DOCUMENTS

| | | |
|---|---|---|
| CN | 101248330 A | 8/2008 |
| CN | 102288621 A | 12/2011 |
| CN | 202383388 U | 8/2012 |
| CN | 102865815 A | 1/2013 |
| CN | 103363928 A | 10/2013 |
| CN | 203337570 U | 12/2013 |
| CN | 103733138 A | 4/2014 |
| CN | 203519954 U | 4/2014 |
| CN | 103858001 A | 6/2014 |
| CN | 104019773 A | 9/2014 |
| CN | 104102402 A | 10/2014 |
| CN | 204101012 U | 1/2015 |
| CN | 104677314 A | 6/2015 |
| JP | 2006064496 A | 3/2006 |
| JP | 2012202713 A | 10/2012 |

OTHER PUBLICATIONS

Written Opinion of the International Searching Authority dated Nov. 27, 2015 corresponding to International application No. PCT/CN2015/087336.
First Office Action dated Nov. 22, 2016 in corresponding Chinese Application No. 201510093122.4.

* cited by examiner

DEVICE AND METHOD FOR DETECTING FLATNESS OF SURFACE OF DISPLAY PANEL This is a National Phase Application filed under 35 U.S.C. 371 as a national stage of PCT/CN2015/087336 filed on Aug. 18, 2015, an application claiming the benefit of Chinese Application No. 201510093122.4 filed on Mar. 2, 2015, the content of each of which is hereby incorporated by reference in its entirety.

FIELD OF THE INVENTION

The present invention relates to the technical field of display, and in particular to a device for detecting the flatness of a surface of a display panel and a method for detecting the flatness of the surface of the display panel.

BACKGROUND OF THE INVENTION

A display panel includes an array substrate and an opposite substrate aligned and combined with the array substrate to form a cell. During a general manufacturing of display panel, it is required to prepare a thin film transistor, a pixel electrode, a signal line and other structures on the array substrate, and prepare a color filter, a black matrix and other structures on the opposite substrate first. Then, the array substrate (or the opposite substrate) is provided with spacers thereon and coated with a sealant on edges thereof, the array substrate is aligned and combined with the opposite substrate, and liquid crystal is injected therebetween. In this way, a display panel is completely prepared.

During the aforementioned preparation process, due to some factors such as different heights of the spacers, non-uniform thickness of the sealant coated in regions of the edges, and deviation occurred in the aligning and combining process of the array substrate and the opposite substrate, the display panel obtained after the array substrate is aligned and combined with the opposite substrate is prone to have poor flatness. Hence, after the display panel is completely prepared, it is required to detect the flatness of the surface of the display panel.

Particularly for a touch display panel of an On-Cell type, during the preparation process, it is required to perform deposition, coating, exposure, developing, etching and other processes after the array substrate is aligned and combined with the opposite substrate, so as to prepare a touch electrode on the side of the opposite substrate, thus realizing a touch operation. During the exposure, the poor flatness of the surface of the display panel easily results in misalignment in exposure. As a result, the shape and precision of the touch electrode will be influenced. Hence, for a touch display panel of the On-Cell type, it is more required to detect the flatness of the surface of the display panel obtained after the array substrate is aligned and combined with the opposite substrate, prior to the formation of the touch electrode, so as to prevent the poor flatness from influencing the subsequent formation of the touch electrode.

In the prior art, the flatness of the surface of the display panel is generally detected by using a probe to scratch the surface of the display panel. However, in the aforementioned detection method, the probe comes into contact and rubs with the display panel. In this way, the display panel is likely to have scratches thereon, and powder/particles and other pollutants may be produced, thereby damaging the display panel and destroying the cleanliness of the display panel.

SUMMARY OF THE INVENTION

The present invention is intended to solve at least one of the problems in the prior art. A device and a method for detecting the flatness of a surface of a display panel are provided. Contact with the display panel is not required during detection of the flatness of the surface of the display panel, so that damage and pollution of the display panel may be avoided.

In order to achieve an objective of the present invention, one aspect of the present invention provides a device for detecting the flatness of a surface of a display panel, including a bearing platform, an image acquisition unit and a data processing unit, wherein the bearing platform is used for bearing a display panel; the image acquisition unit moves in a detection plane parallel to a bearing surface of the bearing platform and is used for focusing detection points preset in a surface of the display panel facing the image acquisition unit, in a direction perpendicular to the bearing surface of the bearing platform to obtain a focal length at the end of focusing, and sending focal length data representative of the focal length to the data processing unit; and the data processing unit is used for calculating a distance of each of the detection points from the detection plane according to the focal length data sent from the image acquisition unit, and accordingly determining the flatness of the surface of the display panel facing the image acquisition unit.

Preferably, the detection points are uniformly distributed on the surface of the display panel facing the image acquisition unit.

Preferably, the data processing unit is further used for generating a contour map of the surface of the display panel facing the image acquisition unit according to the distance of each of the detection points from the detection plane; and the device for detecting the flatness of a surface of a display panel further includes a monitor used for displaying the contour map generated by the data processing unit.

Preferably, the image acquisition unit includes a first acquisition module and a second acquisition module; the first acquisition module is used for acquiring images of all regions including the surface of the display panel facing the image acquisition unit; and the second acquisition module is used for capturing patterns at the detection points and focusing the patterns.

Preferably, the data processing unit is further used for identifying preset marks in the images acquired by the first acquisition module, to establish a basic coordinate system and a precise coordinate system; the basic coordinate system is used for identifying whether the display panel deviates from a normal position for detecting the flatness of a surface; and the precise coordinate system is used for determining a coordinate of each of the points on the surface of the display panel facing the image acquisition unit.

Preferably, the second acquisition module focuses the detection points in a variable-focus range of 10 times to 100 times.

Preferably, the second acquisition module includes a lens and a plurality of focusing components which have different variable-focus ranges.

As another aspect, the present invention further provides a method for detecting the flatness of a surface of a display panel, including:

S1: placing a display panel on a bearing surface of a bearing platform;

S2: enabling an image acquisition unit to move in a detection plane parallel to the bearing surface of the bearing platform, focusing detection points preset in a surface of the display panel facing the image acquisition unit, in a direction perpendicular to the bearing surface of the bearing platform to obtain a focal length at the end of focusing; and S3: calculating a distance of each of the detection points from the detection plane according to focal length data representative of the focal length at the end of focusing, and accordingly determining the flatness of the surface of the display panel.

Preferably, in step S1, the bearing platform is arranged horizontally.

Preferably, the method further includes: step S0: before step S1, detecting the levelness of the bearing platform and performing correction when the levelness of the bearing platform exceeds a preset range.

Preferably, the method further includes: step S2a: after step S1 and before step S2, acquiring images of all regions including the surface of the display panel facing the image acquisition unit and identifying preset marks in the images to establish a basic coordinate system and a precise coordinate system; the basic coordinate system is used for identifying whether the display panel deviates from a normal position for detecting the flatness of a surface; and the precise coordinate system is used for determining a coordinate of each of the points on the surface of the display panel facing the image acquisition unit.

Preferably, the method for detecting the flatness of a surface of a display panel, further includes:

S4: after step S3, generating a contour map of the surface of the display panel facing the image acquisition unit according to the distance of each of the detection points from the detection plane, and displaying the contour map on a monitor.

Preferably, the display panel includes an array substrate and an opposite substrate aligned and combined with the array substrate to form a cell, and a touch electrode used for realizing a touch function; the touch electrode is arranged on the opposite substrate, and the touch electrode and the array substrate are respectively positioned on both sides of the opposite substrate; and any aforementioned method for detecting the flatness of a surface of a display panel is performed before the touch electrode is formed on the opposite substrate, and a surface of the display panel to be detected is a surface of the opposite substrate.

The present invention has the following beneficial effects.

In the device for detecting the flatness of a surface of a display panel provided by the present invention, the flatness of the surface of the display panel facing the image acquisition unit is determined by focusing detection points on the surface of the display panel, placed on the bearing platform, facing the image acquisition unit and calculating the distance of each of the detection points from the detection plane according to a corresponding focal length at the end of focusing. Compared with the prior art, in the present invention, the flatness of the surface of the display panel can be detected without contacting the display panel, and the damage and pollution to the display panel are thus avoided.

In the method for detecting the flatness of a surface of a display panel provided by the present invention, the flatness of the surface of the display panel is determined by focusing a plurality of detection points on the surface of the display panel facing the image acquisition unit and calculating the distance of each of the detection points from the detection plane according to the focal length at the end of focusing. Compared with the prior art, in the present invention, the flatness of the surface of the display panel can be detected without contacting the display panel, and the damage and pollution to the display panel are thus avoided.

BRIEF DESCRIPTION OF THE DRAWINGS

The accompanying drawings are used for providing further understanding of the present invention, constitute a part of the specification, and are used for explaining the present invention together with the following specific embodiments but not for limiting the present invention, and in the drawings.

REFERENCE NUMERALS

10: bearing platform; 11: image acquisition unit; 12: data processing unit;

13: monitor; 20: display panel; 110: first acquisition module;

111: second acquisition module; 200: array substrate; 201: opposite substrate;

202: touch electrode; 1110: lens; and 1111, 1112: focusing component.

DESCRIPTION OF THE PREFERRED EMBODIMENT

The specific embodiments of the present invention will be described in detail as below with reference to the accompanying drawings. It should be understood that the specific embodiments to be described here are merely used for describing and explaining the present invention, but not for limiting the present invention.

Figure 1:
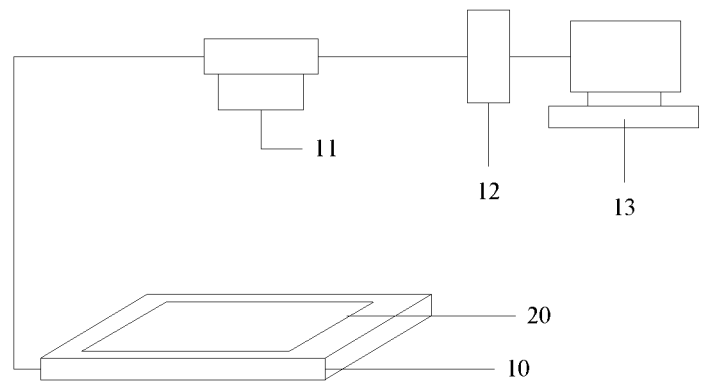
FIG. 1 is a schematic diagram of a device for detecting the flatness of a surface of a display panel according to an embodiment of the present invention.

The present invention provides embodiments of a device for detecting the flatness of a surface of a display panel. FIG. 1 is a schematic diagram of the device for detecting the flatness of the surface of the display panel according to an embodiment of the present invention. As shown in FIG. 1, in this embodiment, the device for detecting the flatness of the surface of the display panel includes a bearing platform 10, an image acquisition unit 11 and a data processing unit 12. The bearing platform 10 is used for bearing a display panel 20. The image acquisition unit 11 moves in a detection plane parallel to a bearing surface of the bearing platform 10 and is used for focusing detection points preset in a surface of the display panel 20 facing the image acquisition unit 11, in a direction perpendicular to the bearing surface to obtain a focal length at the end of focusing, and sending focal length data representative of the focal length to the data processing unit 12. As the detection plane is a plane parallel to the bearing surface of the bearing platform 10, and positions where the image acquisition unit 11 is located when performing focusing are always located in the plane, the distance between the image acquisition unit 11 and the bearing platform 10 is ensured to be constant. The data processing unit 12 is used for calculating a distance of each of the detection points from the detection plane according to the focal length data sent from the image acquisition unit 11, and accordingly determining the flatness of the surface of the display panel 20 facing the image acquisition unit 11.

The distance between a certain detection point and the detection plane having the image acquisition unit 11 therein may be calculated according to the focal length at the end of focusing when the image acquisition unit 11 focuses the detection point on the surface of the display panel 20, placed on the bearing platform 10, facing the image acquisition unit 11. Thus, the image acquisition unit 11 is moved in the detection plane parallel to the bearing surface of the bearing platform 10 used for placing the display panel 20 thereon to arrive at positions corresponding to the plurality of detection points on the surface of the display panel 20 facing the image acquisition unit 11, thus focusing in the direction perpendicular to the bearing surface to obtain the focal length at the end of focusing the corresponding detection points. The distances between the plurality of detection points and the plane (i.e., the detection plane) having the image acquisition unit 11 therein may be determined according to the focal length data representative of the focal length at the end of focusing the plurality of detection points. Further, the relative flatness between the plurality of detection points on the display panel 20 may be determined according to the distances between the plurality of detection points and the detection plane having the image acquisition unit 11 therein, thus reflecting the flatness of the display panel 20 (specifically regions having the plurality of detection points therein).

In this embodiment, the data processing unit 12 is further used for generating a contour map of the surface of the display panel 20 facing the image acquisition unit 11 according to the distance of each of the detection points from the detection plane. Moreover, as shown in FIG. 1, the device for detecting the flatness of the surface of the display panel may further include a monitor 13 used for displaying the contour map generated by the data processing unit 12. In this way, it is convenient for workers to observe the flatness of the surface of the display panel 20, intuitively. In other embodiments, the device for detecting the flatness of the surface of the display panel may have an interface for exchanging data by connecting a transmission signal line with an external monitor, instead of including the monitor 13.

Figure 2:
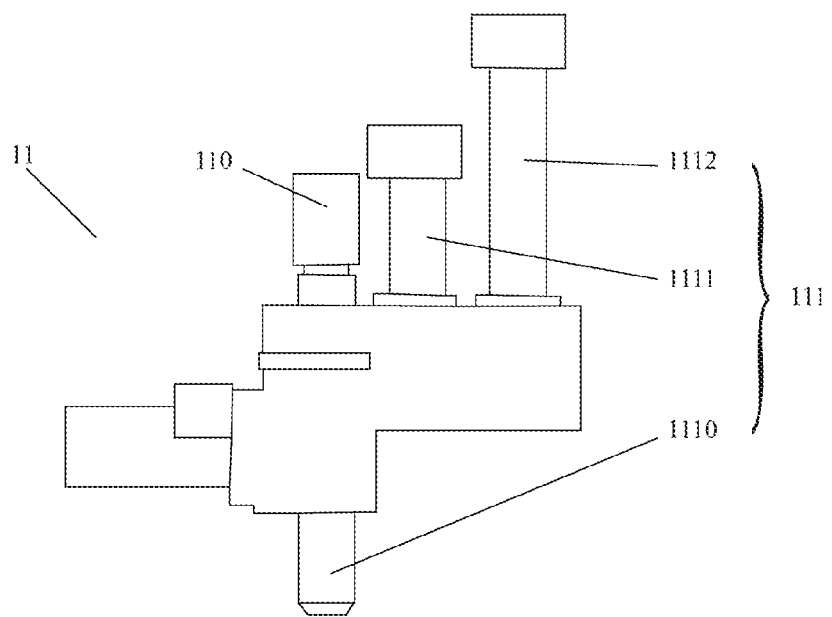
FIG. 2 is a schematic diagram of an image acquisition unit according to an embodiment of the present invention.

As shown in FIG. 2, the image acquisition unit 11 may include a first acquisition module 110 and a second acquisition module 111; the first acquisition module 110 is used for acquiring images of all regions including the surface of the display panel 20 facing the image acquisition unit 11; and the second acquisition module 111 is used for capturing patterns (such as a color filter) at the detection points and finishing focusing the patterns. The first acquisition module 110 and the second acquisition module 111 may be cameras.

Specifically, first, according to the image of the display panel 20 acquired by the first acquisition module 110, the data processing unit 12 identifies a part of the preset marks in the image to establish a basic coordinate system. The basic coordinate system may include only one axis (for example, an x-axis), which is mainly used for identifying whether the placement position of the display panel 20 on the bearing platform 10 is accurate. The identification process is specifically as follows: after the basic coordinate system above is established, edges of the display panel 20 are identified, and it is determined whether an angle between the edges of the display panel 20 and the x-axis is a preset value, or within a preset range; if yes, it indicates that the display panel 20 is accurately placed at a corresponding position on the bearing platform 10; and otherwise, it indicates that the display panel 20 is not accurately placed at the corresponding position on the bearing platform 10, and in this case, it is required to adjust the position of the display panel 20 so that the display panel 20 is accurately located at the corresponding position on the bearing platform 10.

After it is confirmed that the display panel 20 is accurately placed at the corresponding position on the bearing platform 10, the date processing unit 12 continues to identify other marks in the image according to the image of the display panel 20 acquired by the first acquisition module 110, and a precise coordinate system is established according to the identified marks. The precise coordinate system may include two axes (for example, an x-axis and a y-axis) so as to determine a coordinate of each of the points on the surface of the display panel 20 facing the image acquisition unit 11.

After the precise coordinate system is established to solely position each of the points on the surface of the display panel 20 facing the image acquisition unit 11 in a two-dimensional plane, the detection points may be selected on the surface of the display panel 20 facing the image acquisition unit 11, that is, the coordinates of the detection points to be focused are determined. Generally, the more the selected detection points are, the more uniformly the detection points are distributed on the display panel 20, and the more accurate the finally obtained detection results are; whereas the less the selected detection points are, the poorer the uniformity of the distribution of the detection points on the display panel 20 is, the greater the deviation of the finally obtained detection results is, and the poorer the accuracy is. In a case where only the accuracy of the detection results is taken into consideration, the number of the selected detection points may be equal to the number of pixels on the display panel. In this way, the accuracy of the finally obtained detection results is the highest. However, it may be understood that the detection in such a way will take a long period of time, and the efficiency is low. Hence, in practice, an appropriate number of detection points may be eclectically selected on the surface of the display panel 20, and the plurality of detection points are uniformly distributed on the surface of the display panel 20. In this case, the surface to be detected of the display panel may be divided into a plurality of regions having a specific size, one detection point is selected for each of the regions, and each of the detection points is representative of a region having the detection point therein. For example, the surface to be detected of the display panel may be divided into a plurality of identical rectangular regions, and a central point of each of the rectangles is selected to be the detection point. By detecting the flatness of each of the detection points relative to other regions on the surface of the display panel 20, the flatness of the region relative to other regions on the surface of the display panel 20 is obtained. The aforementioned method for dividing regions is merely an example, and the regions may be divided by other methods.

After the number and coordinates of the detection points are determined, the second acquisition module 111 may be used to focus the plurality of detection points at positions respectively corresponding to the plurality of detection points (the distance between the second acquisition module 111 and the bearing surface of the bearing platform 10 is the same when the second acquisition module 111 focuses the detection points, that is, all positions where the second acquisition module 111 is located when the second acquisition module 111 focuses the detection points are located in the detection plane parallel to the bearing surface of the bearing platform 10), thus obtaining the focal length data at the end of focusing the plurality of detection points and calculating the distances between the plurality of detection points and the detection plane according to the focal length data. Further, the flatness of the surface of the display panel 20 facing the image acquisition unit 11 is determined according to the distances between the plurality of detection points and the detection plane (the plane having the second acquisition module 111 therein in this embodiment). For example, when the distances between the plurality of detection points and the detection plane are distributed within a small interval, the height difference of regions having the plurality of detection points therein is small, and the flatness of the surface of the display panel 20 facing the image acquisition unit 11 is excellent; and otherwise, when the distances between the plurality of detection points and the detection plane are distributed within a large interval, the height difference of regions having the plurality of detection points therein is large, and the flatness of the surface of the display panel 20 facing the image acquisition unit 11 is poor.

The size of the color filter and other patterns acquired by the second acquisition module 111 is generally micron-sized. In this embodiment, in order to capture and focus the micron-sized patterns, the second acquisition module 111 focuses the detection points on the display panel 20 in a variable-focus range of 10 times to 100 times (zoom ratio).

Specifically, the second acquisition module 111 may include a lens and one focusing component having a large variable-focus range, and of course, may further include a lens and a plurality of focusing components having different variable-focus ranges. For example, as shown in FIG. 2, the second acquisition module 111 may include a lens 1110 and focusing components 1111 and 1112, wherein the variable-focus range of the focusing component 1111 may be 25 times, and the variable-focus range of the focusing component 1112 may be 50 times. In this case, variable focusing of 25 times can be realized when the focusing component 1111 is combined with the lens 1110, and variable focusing of 50 times can be realized when the focusing component 1112 is combined with the lens 1110.

Further, the focusing components of the second acquisition module 111 may be laser auto-focusing systems, the focusing process of which is specifically as follows. First, laser light is emitted to a detection point, and a driving mechanism is used to drive the focusing components to move up and down continually. In this process, the lens captures the image of the detection point rapidly (for example, 60 frames per second). Then, the clearest image is found out from the captured images, one detection point is thus completely focused, wherein the focal length when the clearest image is captured is the focal length required for the detection.

In the device for detecting the flatness of the surface of the display panel provided by embodiments of the present invention, the flatness of the surface of the display panel 20 facing the image acquisition unit 11 is determined by focusing detection points on the surface of the display panel 20, placed on the bearing platform 10, facing the image acquisition unit 11 and calculating the distance of each of the detection points from the detection plane according to the focal length at the end of focusing. Compared with the prior art, in this embodiment, the flatness of the surface can be detected without contacting the display panel 20, the damage and pollution to the display panel 20 are thus avoided.

Figure 3:
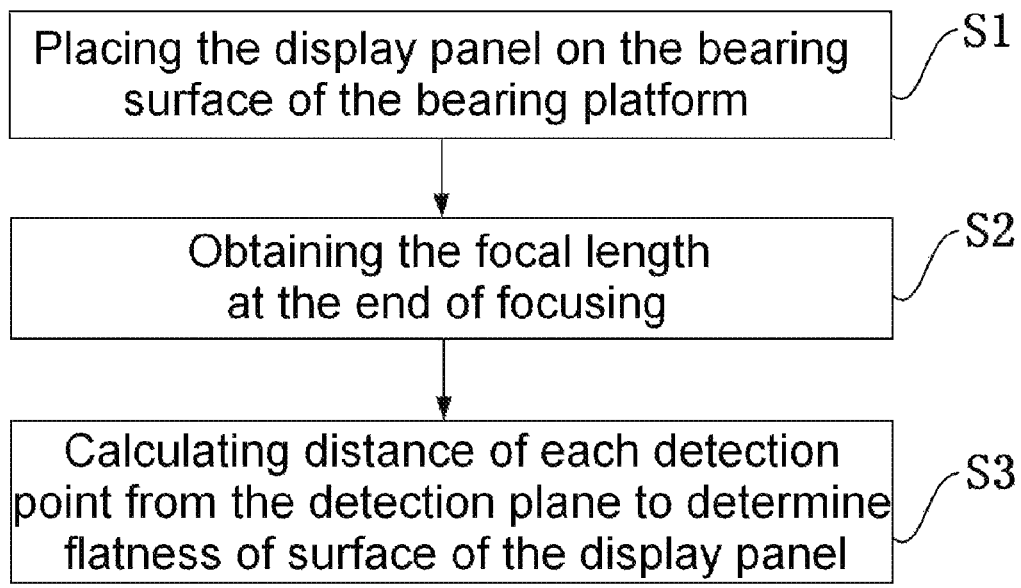
FIG. 3 is a flow chart of a method for detecting the flatness of a surface of a display panel according to an embodiment of the present invention.

The present invention further provides a method for detecting the flatness of a surface of a display panel. FIG. 3 is a flow chart of the method for detecting the flatness of the surface of the display panel according to an embodiment of the present invention. As shown in FIG. 3, in this embodiment, the method for detecting the flatness of the surface of the display panel includes the following steps S1-S3.

S1: placing a display panel on a bearing surface of a bearing platform.

S2: obtaining a focal length at the end of focusing.

An image acquisition unit moves in a detection plane parallel to the bearing surface of the bearing platform, focusing is performed in a direction perpendicular to the bearing surface with respect to detection points preset in a surface of the display panel facing the image acquisition unit to obtain the focal length at the end of focusing.

After the number and coordinates of the detection points to be detected are set, in step S2, the image acquisition unit is successively located at positions corresponding to the detection points in the direction perpendicular to the bearing surface, thus focusing corresponding detection points to obtain the focal length at the end of focusing.

S3: calculating a distance of each of the detection points from the detection plane to determine the flatness of the surface of the display panel.

A distance of each of the detection points from the detection plane is calculated according to focal length data representative of the focal length at the end of focusing, and the flatness of the surface of the display panel is accordingly determined.

Specifically, in step S3, if the distance of each of the detection points from the detection plane is distributed within a small interval, the flatness of the surface of the display panel facing the image acquisition unit is excellent. Otherwise, if the distance of each of the detection points from the detection plane is distributed within a large interval, the flatness of the surface of the display panel facing the image acquisition unit is poor.

Figure 5:
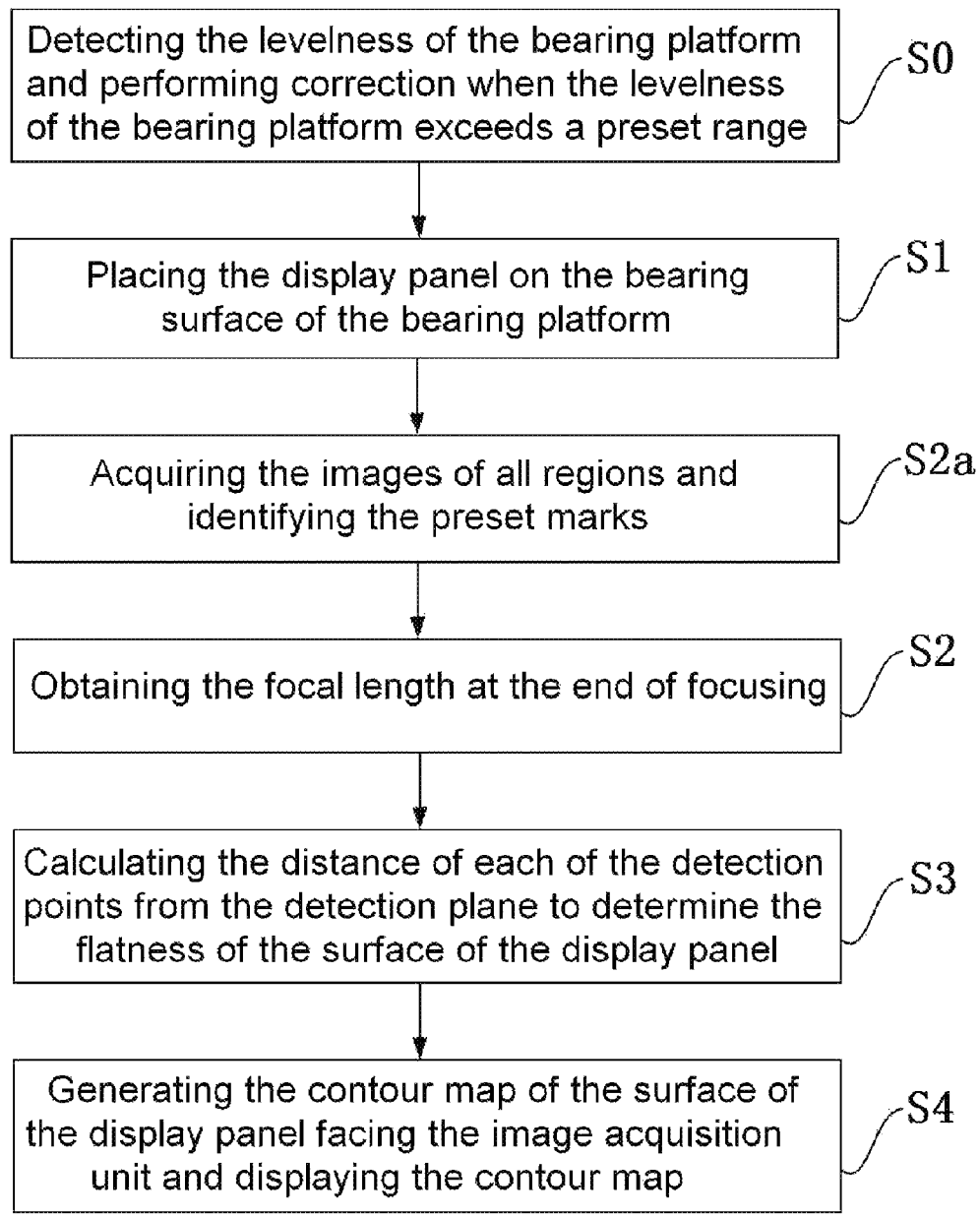
FIG. 5 is a flow chart of the method for detecting the flatness of a surface of a display panel according to other embodiments of the present invention.

FIG. 5 is a flow chart of the method for detecting the flatness of a surface of a display panel according to other embodiments of the present invention. In the embodiment as shown in FIG. 5, steps the same as those in FIG. 3 are designated by the same reference numerals, and description thereof is omitted.

In an example, in order to ensure the bearing platform in step S1 to be horizontal, before step S1 is performed, the method may further include:

S0: detecting the levelness of the bearing platform and performing correction when the levelness of the bearing platform exceeds a preset range, wherein the levelness may be detected specifically by a gradienter.

In an example, the method may further include:

S2a: after step S1 and before step S2, acquiring images of all regions including the surface of the display panel facing the image acquisition unit and identifying preset marks in the images to establish a basic coordinate system and a precise coordinate system; the basic coordinate system being used for identifying whether the display panel deviates from a normal position for detecting the flatness of a surface; the precise coordinate system being used for determining a coordinate of each of the points on the surface of the display panel facing the image acquisition unit, wherein the establishing processes and applications of the basic coordinate system and the precise coordinate system have been described in detail in the aforementioned embodiments of the device for detecting the flatness of the surface of the display panel, and will not be repeated here.

In an example, the method for detecting the flatness of the surface of the display panel may further include:

S4: after step S3 in which the distance of each of the detection points from the detection plane is calculated, generating a contour map of the surface of the display panel facing the image acquisition unit according to the distance of each of the detection points from the detection plane, and displaying the contour map on a monitor.

With step S4, workers may observe the flatness of the surface of the display panel, intuitively.

Figure 4:
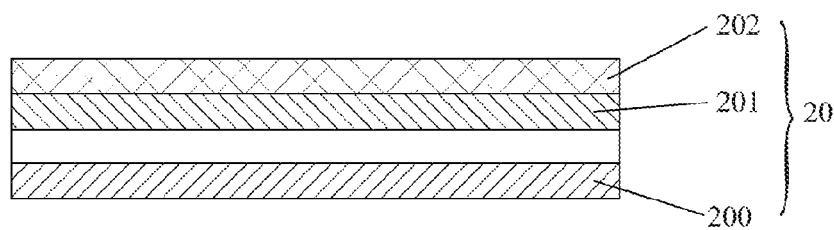
FIG. 4 is a schematic diagram of a display panel to be detected by the detection method according to an embodiment of the present invention.

In an embodiment, as shown in FIG. 4, the display panel 20 to be detected includes an array substrate 200 and an opposite substrate 201 aligned and combined with the array substrate to form a cell, and a touch electrode 202 used for realizing a touch function. The touch electrode 202 is arranged on the opposite substrate 201, and the touch electrode 202 and the array substrate 200 are respectively positioned on both sides of the opposite substrate 201. In this embodiment, the flatness of a surface of the display panel 20 is detected before the touch electrode 202 is formed on the opposite substrate 201, and the surface of the display panel 20 to be detected is a surface of the opposite substrate 201. Specifically, during the preparation of the display panel 20, the array substrate 200 and the opposite substrate 201 are prepared first, and then the array substrate 200 is aligned and combined with the cell substrate 201 to form a cell. Subsequently, the flatness of the display panel after alignment and combination is detected to make the flatness of the surface of the display panel meet requirements during the preparation of the touch electrode 202. At last, a touch electrode 202 is formed on the display panel with the flatness of the surface meeting the requirements (i.e., on the surface of the opposite substrate 201 aligned and combined with the array substrate 200, which has the flatness meeting the requirements).

In the method for detecting the flatness of the surface of the display panel provided by the embodiments of the present invention, the flatness of the surface of the display panel facing the image acquisition unit is determined by focusing a plurality of detection points on the surface of the display panel facing the image acquisition unit and calculating the distance between each of the detection points and the detection plane according to the focal length at the end of focusing. Compared with the prior art, in this embodiment, the flatness of the surface can be detected without contacting the display panel, and the damage and pollution to the display panel are thus avoided.

It may be understood that the aforementioned embodiments are exemplary embodiments merely used for describing the principle of the present invention, and the present invention is not limited thereto. For a person of ordinary skill in the art, various variations and improvements may be made without departing from the spirit and essence of the present invention, and those variations and improvements shall also be regarded as being within the protection scope of the present invention.

The invention claimed is:

1. A device for detecting flatness of a surface of a display panel, comprising:
   a bearing platform used for bearing the display panel;
   an image acquisition unit that moves in a detection plane parallel to a bearing surface of the bearing platform and is used for focusing detection points preset in a surface of the display panel facing the image acquisition unit in a direction perpendicular to the bearing surface of the bearing platform, to obtain a focal length at the end of focusing, and sending focal length data representative of the focal length to a data processing unit; and
   a data processing unit used for calculating a distance of each of the detection points from the detection plane according to the focal length data sent from the image acquisition unit, and accordingly determining the flatness of the surface of the display panel facing the image acquisition unit.

2. The device for detecting flatness of a surface of a display panel according to claim 1, wherein the detection points are uniformly distributed on the surface of the display panel facing the image acquisition unit.

3. The device for detecting flatness of a surface of a display panel according to claim 1, wherein
   the data processing unit is further used for generating a contour map of the surface of the display panel facing the image acquisition unit according to the distance of each of the detection points from the detection plane; and
   the device for detecting flatness of a surface of a display panel further comprises a monitor used for displaying the contour map generated by the data processing unit.

4. The device for detecting flatness of a surface of a display panel according to claim 1, wherein the image acquisition unit comprises a first acquisition module and a second acquisition module;
   the first acquisition module is used for acquiring images of all regions including the surface of the display panel facing the image acquisition unit; and
   the second acquisition module is used for capturing patterns at the detection points and focusing the patterns.

5. The device for detecting flatness of a surface of a display panel according to claim 4, wherein the data processing unit is further used for identifying preset marks in the images acquired by the first acquisition module, to establish a basic coordinate system and a precise coordinate system;
   the basic coordinate system is used for identifying whether the display panel deviates from a normal position for detecting flatness of a surface to be detected; and
   the precise coordinate system is used for determining a coordinate of each of the points on the surface of the display panel facing the image acquisition unit.

6. The device for detecting flatness of a surface of a display panel according to claim 4, wherein the second acquisition module focuses the detection points in a variable-focus range of 10 times to 100 times.

7. The device for detecting flatness of a surface of a display panel according to claim 6, wherein the second acquisition module comprises a lens and a plurality of focusing components which have different variable-focus ranges.

8. A method for detecting flatness of a surface of a display panel, comprising:
   S1: placing a display panel on a bearing surface of a bearing platform;
   S2: enabling an image acquisition unit to move in a detection plane parallel to the bearing surface of the bearing platform, focusing detection points preset in a surface of the display panel facing the image acquisition unit in a direction perpendicular to the bearing surface of the bearing platform, to obtain a focal length at the end of focusing; and
   S3: calculating a distance of each of the detection points from the detection plane according to focal length data representative of the focal length at the end of focusing, and accordingly determining the flatness of the surface of the display panel.

9. The method for detecting flatness of a surface of a display panel according to claim 8, wherein the bearing platform is arranged horizontally.

10. The method for detecting flatness of a surface of a display panel according to claim 9, further comprising:
   step S0: before step S1, detecting levelness of the bearing platform and performing correction when the levelness of the bearing platform exceeds a preset range.

11. The method for detecting flatness of a surface of a display panel according to claim 8, further comprising:
   step S2a: after step S1 and before step S2, acquiring images of all regions including the surface of the display panel facing the image acquisition unit and identifying preset marks in the images to establish a basic coordinate system and a precise coordinate system;
   the basic coordinate system being used for identifying whether the display panel deviates from a normal position for detecting flatness of a surface to be detected; and
   the precise coordinate system is used for determining a coordinate of each of the points on the surface of the display panel facing the image acquisition unit.

12. The method for detecting flatness of a surface of a display panel according to claim 8, further comprising:
   S4: after step S3, generating a contour map of the surface of the display panel facing the image acquisition unit according to the distance of each of the detection points from the detection plane, and displaying the contour map on a monitor.

13. The method for detecting flatness of a surface of a display panel according to claim 8, wherein the display panel comprises an array substrate and an opposite substrate aligned and combined with the array substrate to form a cell, and a touch electrode used for realizing a touch function;
   the touch electrode is arranged on the opposite substrate, and the touch electrode and the array substrate are respectively positioned on both sides of the opposite substrate; and
   the method for detecting flatness of a surface of a display panel according to claim 8 is performed before the touch electrode is formed on the opposite substrate, and the surface of the display panel to be detected is a surface of the opposite substrate.

14. The method for detecting flatness of a surface of a display panel according to claim 9, wherein the display panel comprises an array substrate and an opposite substrate aligned and combined with the array substrate to form a cell, and a touch electrode used for realizing a touch function;
   the touch electrode is arranged on the opposite substrate, and the touch electrode and the array substrate are respectively positioned on both sides of the opposite substrate; and
   the method for detecting flatness of a surface of a display panel according to claim 9 is performed before the touch electrode is formed on the opposite substrate, and the surface of the display panel to be detected is a surface of the opposite substrate.

15. The method for detecting flatness of a surface of a display panel according to claim 10, wherein the display panel comprises an array substrate and an opposite substrate aligned and combined with the array substrate to form a cell, and a touch electrode used for realizing a touch function;
   the touch electrode is arranged on the opposite substrate, and the touch electrode and the array substrate are respectively positioned on both sides of the opposite substrate; and
   the method for detecting flatness of a surface of a display panel according to claim 10 is performed before the touch electrode is formed on the opposite substrate, and the surface of the display panel to be detected is a surface of the opposite substrate.

16. The method for detecting flatness of a surface of a display panel according to claim 11, wherein the display panel comprises an array substrate and an opposite substrate aligned and combined with the array substrate to form a cell, and a touch electrode used for realizing a touch function;
   the touch electrode is arranged on the opposite substrate, and the touch electrode and the array substrate are respectively positioned on both sides of the opposite substrate; and
   the method for detecting flatness of a surface of a display panel according to claim 11 is performed before the touch electrode is formed on the opposite substrate, and the surface of the display panel to be detected is a surface of the opposite substrate.

17. The method for detecting flatness of a surface of a display panel according to claim 12, wherein the display panel comprises an array substrate and an opposite substrate aligned and combined with the array substrate to form a cell, and a touch electrode used for realizing a touch function;
   the touch electrode is arranged on the opposite substrate, and the touch electrode and the array substrate are respectively positioned on both sides of the opposite substrate; and
   the method for detecting flatness of a surface of a display panel according to claim 12 is performed before the touch electrode is formed on the opposite substrate, and the surface of the display panel to be detected is a surface of the opposite substrate.

* * * * *